No. 845,473. PATENTED FEB. 26, 1907.
W. B. MURPHY.
SEPARABLE FASTENER.
APPLICATION FILED JUNE 7, 1906.
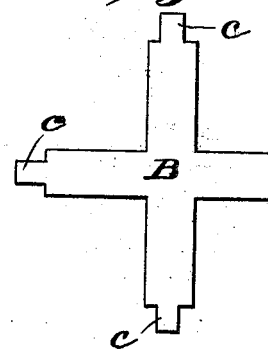
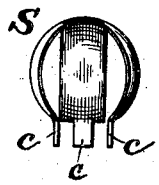
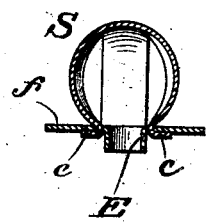
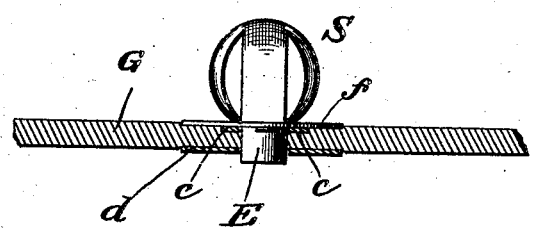
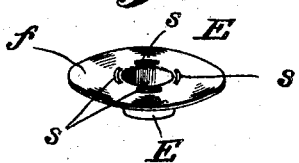
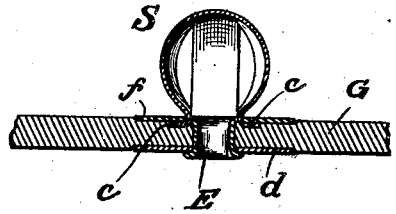
Attest:
Inventor: William B. Murphy
by Henry Bennett, Atty

UNITED STATES PATENT OFFICE.

WILLIAM B. MURPHY, OF NEW YORK, N. Y.

SEPARABLE FASTENER.

No. 845,473.     Specification of Letters Patent.     Patented Feb. 26, 1907.

Application filed June 7, 1906. Serial No. 320,588.

*To all whom it may concern:*

Be it known that I, WILLIAM B. MURPHY, a citizen of the United States, residing in the city, county, and State of New York, have invented certain new and useful Improvements in Separable Fasteners, of which the following is a specification.

This invention relates to the class of fasteners for gloves and the like, sometimes called "buttons," which employ a socket member secured to one part and a resilient or spring stud or ball member secured to the the other part; and the novel features of the present invention reside in the spring stud or ball member and its securing means.

The object of the present invention is to provide the spring-stud with means coöperating with the apertured plate or flange of a securing-eyelet or the like for securing the stud to the goods in a simple and efficient manner.

In the accompanying drawings, which are on an exaggerated scale the better to illustrate embodiments of the invention, Figure 1 is a plan view of a stud-blank before it is rounded up into a spherical or globular form, and Fig. 2 is a side view of the stud after the next operation. Fig. 3 is a sectional view showing the stud clenched to the flange-plate of the securing-eyelet; and Fig. 4 is a side elevation of the connected parts in place in the goods, but before clenching the eyelet. Fig. 5 is a detached perspective view of a securing-eyelet adapted to be used in conjunction with said stud. Fig. 6 is an axial section showing the parts in place when the stud is secured to the fabric or article.

Referring to the principal views, the stud S, which is formed from the blank B, is resiliently compressible laterally, as usual with the ball-like studs of this class of fasteners, and has on the ends of the respective branches of the blank, Fig. 1, tenons or shouldered clips $c$. The securing-eyelet E has a flange-plate $f$, and in this flange are formed slot-like apertures $s$, so spaced and disposed as to receive the respective clips $c$, which pass through the flange-plate until stopped by the shoulders, when the clips are clenched down on the under side or face of the plate, as seen in Fig. 3. The eyelet E is now applied, as in Fig. 4, to the goods G and then clenched down on the goods, as in Fig. 6.

The socket member of the fastening is not shown, as it forms no part of the present invention. Any of the well-known socket members of this class of separable fastenings will serve for use with the stud S.

It will be noted that in the construction shown an integral eyelet or hollow rivet is employed as a securing means, and a washer may be employed at the back of the goods, as seen at $d$ in Figs. 4 and 6.

Having thus described my invention, I claim—

A device for the purpose specified, consisting of a resilient, laterally-compressible, globular stud, provided with shouldered clenching-clips, an apertured plate to rest upon the goods, the clips on the stud extending through the respective apertures in said plate and clenched down on that side of the plate which is to be applied to the goods, and an eyelet integral with said plate for securing the latter to the goods.

In witness whereof I have hereunto signed my name, this 5th day of June, 1906, in the presence of two subscribing witnesses.

WILLIAM B. MURPHY.

Witnesses:
HENRY CONNETT,
H. G. HOSE.